Patented July 28, 1925.

1,547,280

UNITED STATES PATENT OFFICE.

WALTER WOLLASTON, OF CARNEYS POINT, NEW JERSEY, ASSIGNOR TO E. I. DU PONT DE NEMOURS & COMPANY, OF WILMINGTON, DELAWARE, A CORPORATION OF DELAWARE.

PROCESS OF PRODUCING ORTHO-ACYL-BENZOIC ACIDS.

No Drawing. Application filed February 3, 1921. Serial No. 442,263.

*To all whom it may concern:*

Be it known that I, WALTER WOLLASTON, a citizen of the United States, and a resident of Carneys Point, in the county of Salem and State of New Jersey, have invented a certain new and useful Process of Producing Ortho-Acyl-Benzoic Acids, of which the following is a specification.

This invention relates to the production of ortho-benzoyl-benzoic acid or its derivatives by condensation, in the presence of aluminum chloride, of phthalic anhydride with benzene or a benzene derivative. The invention has reference more particularly to an improved method of treating the reaction mass resulting from said condensation whereby the decomposition of the organic aluminum compound and the isolation of the benzoyl-benzoic acid may be effected in a more simple and economical manner than has been done heretofore.

In the manufacture of ortho-benzoyl-benzoic acid, it has been proposed to drown in water the reaction mass, consisting of an aluminum compound of ortho-benzoyl-benzoic acid and excess benzene, and, after distilling off with steam the excess benzene, to decompose the aluminum compound by dissolving with caustic soda, the free acid obtained by acidifying after filtration. It has also been proposed to pour the excess benzene, in the reaction mass, from the aluminum compound, to disintegrate the latter with dilute hydrochloride acid, to treat the resulting mass with sodium carbonate solution, and, after filtration, to form the free benzoyl-benzoic acid by precipitation with acid. According to another modification water or ice is added to the reaction mass, consisting in this case of the aluminum compound of chlorobenzoylbenzoic acid and excess chlorobenzol, followed by the addition of relatively concentrated sulphuric acid; the excess chlorobenzol is then removed by steam distillation, and the residue, after cooling, is filtered to separate crude chlorobenzoylbenzoic acid.

None of the procedures above described is advantageous as the one which I have devised with respect to quality of product, economy of materials, or adaptability to plant operation.

The new procedure which I have invented may be described generally as follows: The aluminum compound of ortho-benzoyl-benzoic acid, or of a derivative of said acid, is decomposed by digesting the reaction mass with a dilute mineral acid, thereby forming a lower layer comprising aluminum chloride dissolved in water, and an upper layer of ortho-benzoyl-benzoic acid or a derivative thereof dissolved in benzene or a benzene derivative, respectively; the two layers are then separated by decantation, and the solution which formed the upper layer is either heated, to remove the benzene or benzene derivative by distillation, or cooled to cause crystallization of the o-benzoylbenzoic acid or of its derivative, as the case may be.

The invention may be illustrated by the following examples:

*Example 1.—Ortho-benzoyl-benzoic acid.*

50 lbs. of phthalic anhydride are dissolved in 200 lbs. of benzene and 100 lbs. of anhydrous aluminum chloride added and the condensation allowed to go to completion at 80° C. The condensation mass consisting of an aluminium compound of ortho-benzoyl-benzoic acid and benzene, is decomposed with the liberation of free benzoyl-benzoic acid which dissolves in the excess benzene, by digestion with 500 lbs. of 4% hydrochloric acid, the aluminium chloride going into solution in the aqueous acid. The upper layer of benzoyl-benzoic acid dissolved in benzene is separated from the aluminium chloride solution and (1) is distilled to remove benzene, or (2) the benzene solution is cooled to crystallize the pure o-benzoyl-benzoic acid, the mother liquor being evaporated to obtain more crystals.

*Example 2.—Chlorobenzoylbenzoic acid.*

50 lbs. of phthalic anhydride are dissolved in 300 lbs. chlorobenzene and 100 lbs. of anhydrous aluminium chloride added and the condensation allowed to go to completion at 120° C. The condensation mass, consisting of an aluminium compound of chlorobenzoyl-benzoic acid and chloro-benzene, is decomposed with the liberation of free chlorobenzoylbenzoic acid which dissolves in the excess of chlorobenzene, by digestion with 500 lbs. of 4% hydrochloric acid, the aluminium chloride going into solution in the aqueous acid. The upper layer of chlorobenzoyl-benzoic acid dissolved in chlorobenzene is separated from the aluminium chloride solution and (1) the chlorobenzene is distilled off, or (2) the chlorobenzene solution is cooled to crystallize the pure chlorobenzoyl-benzoic acid (which is probably para-chlorobenzoyl-benzoic acid), the mother liquor being evaporated to obtain more crystals.

*Example 3.—Methyl-benzoyl-benzoic acid.*

50 lbs. phthalic anhydride are dissolved in 250 lbs. of toluene and 100 lbs. of anhydrous aluminium chloride added and the condensation allowed to go to completion at 100° C. The condensation mass consisting of an aluminium compound of methylbenzoyl-benzoic acid is decomposed with the liberation of free methylbenzoyl-benzoic acid by digestion with 500 lbs. of 4% hydrochloric acid, the aluminium going into solution in the aqueous acid. The upper layer of methylbenzoyl-benzoic acid dissolved in toluene is separated from the aluminium chloride solution and (1) the excess toluene is distilled off, or (2) the toluene solution is cooled to crystallize pure methylbenzoylbenzoic acid, the mother liquor being evaporated to obtain more crystals. The product thus obtained is probably meta-methylbenzoyl-benzoic acid mixed with some para-methylbenzoyl-benzoic acid, since upon dehydration of the product with fuming sulphuric acid, there is obtained beta-methylanthraquinone.

The decomposition of the aluminium compound of benzoyl benzoic acid or of its derivative can be accomplished by adding the condensation mass to the dilute acid or adding the dilute acid to the condensation mass. The acid may be any dilute mineral acid although hydrochloric acid and sulphuric acid are particularly suited. The concentration of the acid may vary considerably without making the process inoperative; it appears, for instance, that under the proper conditions any dilution from 1 to 40% of either hydrochloric acid or sulphuric acid may be used. The quantity of acid should be not less than one mole of hydrochloric or one-half mole of sulphuric acid per mole of aluminium chloride used in the condensation. One and one-half to two moles of hydrochloric or three quarters to one mole of sulphuric acid is sufficient but more can be used without any serious effect although it would not be economical of materials.

The decomposition of the organic aluminium compound is preferably effected at a temperature between about 40° C. and the boiling point of the benzene (or of the benzene derivative) solution in order that the benzoyl-benzoic acid, for instance, as it is formed will become dissolved in the benzene. The treatment with dilute mineral acid may also be carried out in the cold, but in such a case it becomes necessary to subsequently heat the mixture to cause solution in the benzene of any benzoyl-benzoic acid which may have been precipitated.

The ortho-benzoyl-benzoic acid and its halogen and alkyl derivatives exemplified above may be referred to generically as aromatic acyl-ortho-benzoic acids; and benzene and its halogen and alkyl derivatives may be generically designated benzenoid compounds.

By following the new procedure above described a better quality of ortho-benzoyl-benzoic acid or derivative thereof is obtained by crystallization from the benzene or benzene derivative, and a saving of materials is effected since no caustic soda or soda ash is required. However, the chief advantage of my procedure is found in its adaptability to plant operation; thus I have been able to eliminate the steam distillation of benzene or benzene derivative and the solution filtration, precipitation, filtration, and drying of the benzol benzoic acid or derivative. The elimination of these various operations effects a substantial saving in initial cost of the plant and in the cost of operation.

I claim:—

1. The process of producing an aromatic acyl-benzoic acid from the reaction mass resulting from the condensation of phthalic anhydride with a benzenoid compound in the presence of aluminum chloride, and containing an organic aluminum compound mixed with any excess of said benzenoid compound, which comprises digesting said reaction mass with a dilute mineral acid until the organic aluminum compound is decomposed, allowing the mixture to separate into a lower aqueous layer containing an aluminum salt and an upper layer comprising a solution of said aromatic acyl-benzoic acid in said benzenoid compound, separating said layers, and then separating the aromatic acyl-benzoic acid from the benzenoid compound.

2. The process of producing an aromatic acyl-benzoic acid from the reaction mass resulting from the condensation of phthalic anhydride with a benzenoid compound in the presence of aluminum chloride, and containing an organic aluminum compound mixed with any excess of said benzenoid compound, which comprises digesting said reaction mass with a dilute mineral acid until the organic aluminum compound is decomposed, allowing the mixture to separate into a lower aqueous layer containing an aluminum salt and an upper layer comprising a solution of said aromatic acyl-benzoic acid in said benzenoid compound, separating said layers, and then removing the benzenoid compound from the aromatic acyl-benzoic acid by distillation.

3. The process of producing ortho-benzoyl-benzoic acid from the reaction mass resulting from the condensation of phthalic anhydride with benzene in the presence of aluminum chloride, and containing an organic aluminum compound mixed with benzene, which comprises digesting said reaction mass with a dilute mineral acid until the organic aluminum compound is decomposed, allowing the mixture to separate into a lower aqueous layer containing a aluminum salt and an upper layer comprising a solution of ortho-benzoylbenzoic caid in benzene, separating said layers, and then separating the ortho-benzoylbenzoic acid from the benzene.

4. The process of producing ortho-benzoyl-benzonic acid from the reaction mass resulting from the condensation of phthalic anhydride with benzene in the presence of aluminum chloride, and containing an organic aluminum compound mixed with benzene, which comprises digesting said reaction mass with dilute hydrochloric acid until the organic aluminum compound is decomposed, allowing the mixture to separate into a lower aqueous layer containing an aluminum salt and an upper layer comprising a solution of ortho-benzoylbenzoic acid in benzene, separating said layers and then removing the benzene from the ortho-benzoylbenzoic acid by distillation.

In testimony whereof I affix my signature.

WALTER WOLLASTON.

3. The process of producing ortho-benzoyl-benzoic acid from the reaction mass resulting from the condensation of phthalic anhydride with benzene in the presence of aluminum chloride, and containing an organic aluminum compound mixed with benzene, which comprises digesting said reaction mass with a dilute mineral acid until the organic aluminum compound is decomposed, allowing the mixture to separate into a lower aqueous layer containing a aluminum salt and an upper layer comprising a solution of ortho-benzoylbenzoic caid in benzene, separating said layers, and then separating the ortho-benzoylbenzoic acid from the benzene.

4. The process of producing ortho-benzoyl-benzonic acid from the reaction mass resulting from the condensation of phthalic anhydride with benzene in the presence of aluminum chloride, and containing an organic aluminum compound mixed with benzene, which comprises digesting said reaction mass with dilute hydrochloric acid until the organic aluminum compound is decomposed, allowing the mixture to separate into a lower aqueous layer containing an aluminum salt and an upper layer comprising a solution of ortho-benzoylbenzoic acid in benzene, separating said layers and then removing the benzene from the ortho-benzoylbenzoic acid by distillation.

In testimony whereof I affix my signature.

WALTER WOLLASTON.

Certificate of Correction.

It is hereby certified that in Letters Patent No. 1,547,280, granted July 28, 1925, upon the application of Walter Wollaston, of Carneys Point, New Jersey, for an improvement in " Processes of Producing Ortho-Acyl-Benzoic Acids," errors appear in the printed specification requiring correction as follows: Page 1, line 29, after the word " acid " insert the word *being;* line 34, for the word " chloride " read *chloric*, and line 48, before the word " advantageous " insert the word *as;* page 2, line 89, for the word " benzol " read *benzoyl;* page 3, line 13, claim 3, for the misspelled word " caid " read *acid;* and that the said Letters Patent should be read with these corrections therein that the same may conform to the record of the case in the Patent Office.

Signed and sealed this 22d day of September, A. D. 1925.

[SEAL.]

KARL FENNING,
*Acting Commissioner of Patents.*

Certificate of Correction.

It is hereby certified that in Letters Patent No. 1,547,280, granted July 28, 1925, upon the application of Walter Wollaston, of Carneys Point, New Jersey, for an improvement in " Processes of Producing Ortho-Acyl-Benzoic Acids," errors appear in the printed specification requiring correction as follows: Page 1, line 29, after the word " acid " insert the word *being;* line 34, for the word " chloride " read *chloric*, and line 48, before the word " advantageous " insert the word *as;* page 2, line 89, for the word " benzol " read *benzoyl:* page 3, line 13, claim 3, for the misspelled word " caid " read *acid;* and that the said Letters Patent should be read with these corrections therein that the same may conform to the record of the case in the Patent Office.

Signed and sealed this 22d day of September, A. D. 1925.

[SEAL.]                            KARL FENNING,
*Acting Commissioner of Patents.*